United States Patent [19]
Moore

[11] 3,941,704
[45] Mar. 2, 1976

[54] LIQUID CONDITIONING AND SETTLING TANKS

[76] Inventor: Richard Pierpont Moore, P.O. Box 471, Germiston, Transvaal, South Africa

[22] Filed: May 7, 1974

[21] Appl. No.: 467,839

[30] Foreign Application Priority Data
May 11, 1973 South Africa...................... 73/3195

[52] U.S. Cl............................... 210/528; 210/532 R
[51] Int. Cl.²......................................... B01D 21/00
[58] Field of Search ............ 210/91, 196, 273, 276, 210/304, 512, 513, 520, 534, 532, 49, 205, 207, 208, 219, 221, 528

[56] References Cited
UNITED STATES PATENTS

| | | | |
|---|---|---|---|
| 2,528,879 | 11/1950 | Green | 210/208 X |
| 2,643,976 | 6/1953 | Sebald | 210/205 X |
| 2,901,114 | 8/1959 | Smith et al. | 210/205 X |
| 3,006,474 | 10/1961 | Litch | 210/304 X |
| 3,113,100 | 12/1963 | Moore | 210/534 |
| 3,291,315 | 12/1966 | Rossi | 210/512 X |
| 3,314,547 | 4/1967 | Kivell | 210/520 |
| 3,374,896 | 3/1968 | Palmer et al. | 210/273 X |
| 3,450,264 | 6/1969 | Graybill | 210/304 X |
| 3,460,678 | 8/1969 | Condolios | 210/219 |
| 3,486,628 | 12/1969 | Darby | 210/520 |
| 3,545,620 | 12/1970 | Thom | 210/208 |
| 3,733,263 | 5/1973 | Mandt | 210/512 X |
| 3,744,634 | 7/1973 | Schlenz | 210/205 |
| 3,789,984 | 2/1974 | Gaylord | 210/512 |
| 3,850,810 | 11/1974 | Teodoroh | 210/219 |

*Primary Examiner*—Theodore A. Granger
*Attorney, Agent, or Firm*—Haseltine, Lake & Waters

[57] ABSTRACT

A liquid conditioning and settling tank employing the sludge blanket principle in which a body of floc particles termed a sludge blanket is maintained in suspension in the lower portion of the tank by agitation. The floc particles gather impurities in the liquid being treated and thus gain weight. The heavier fraction of these particles settle to the base of the tank whence they are removed. In such a tank a sump is located with an overflow lip at or below the upper level of the sludge blanket. The lighter fractions overflow into the sump where they are able to settle more readily for removal from the tank through the base of the sump.

15 Claims, 3 Drawing Figures

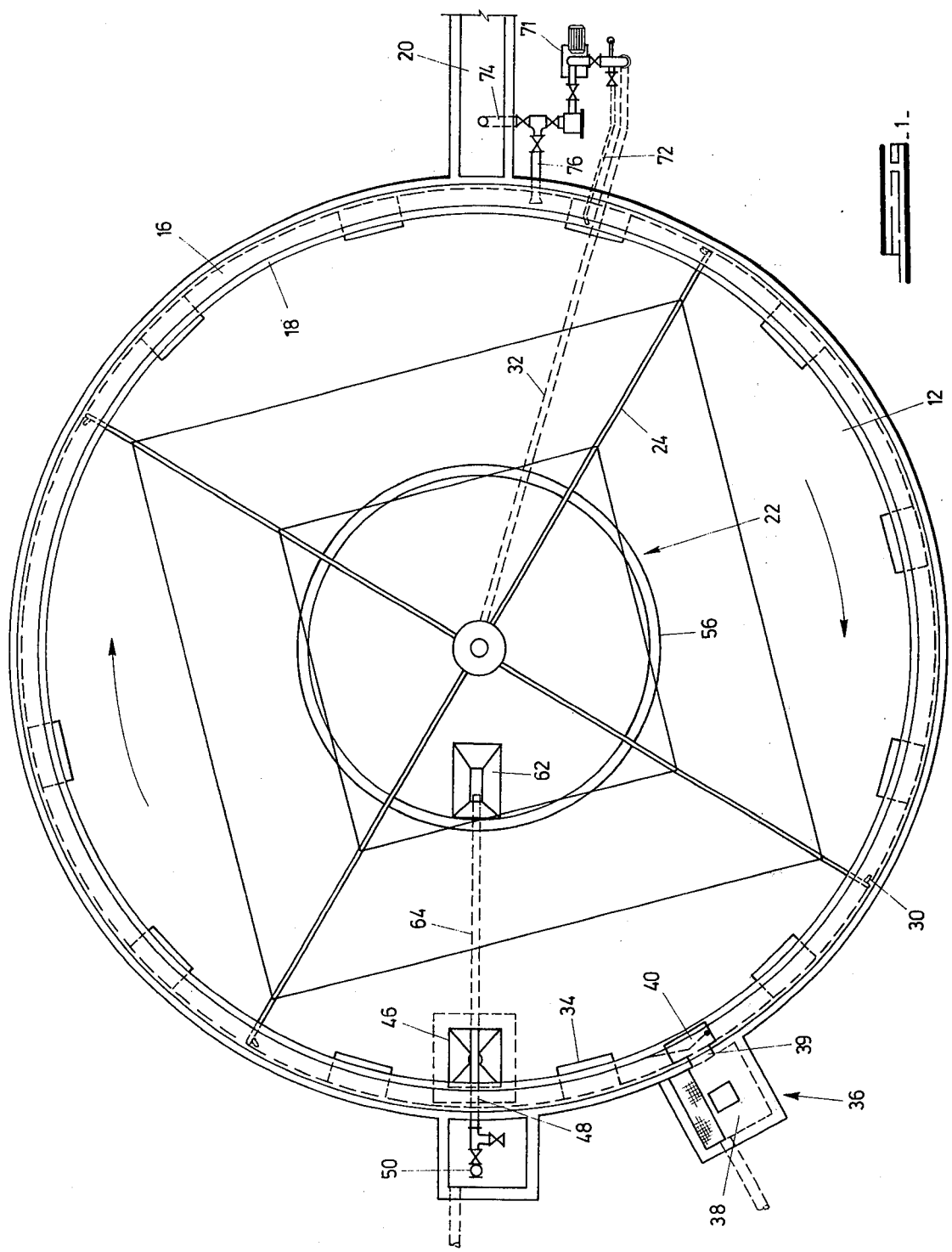

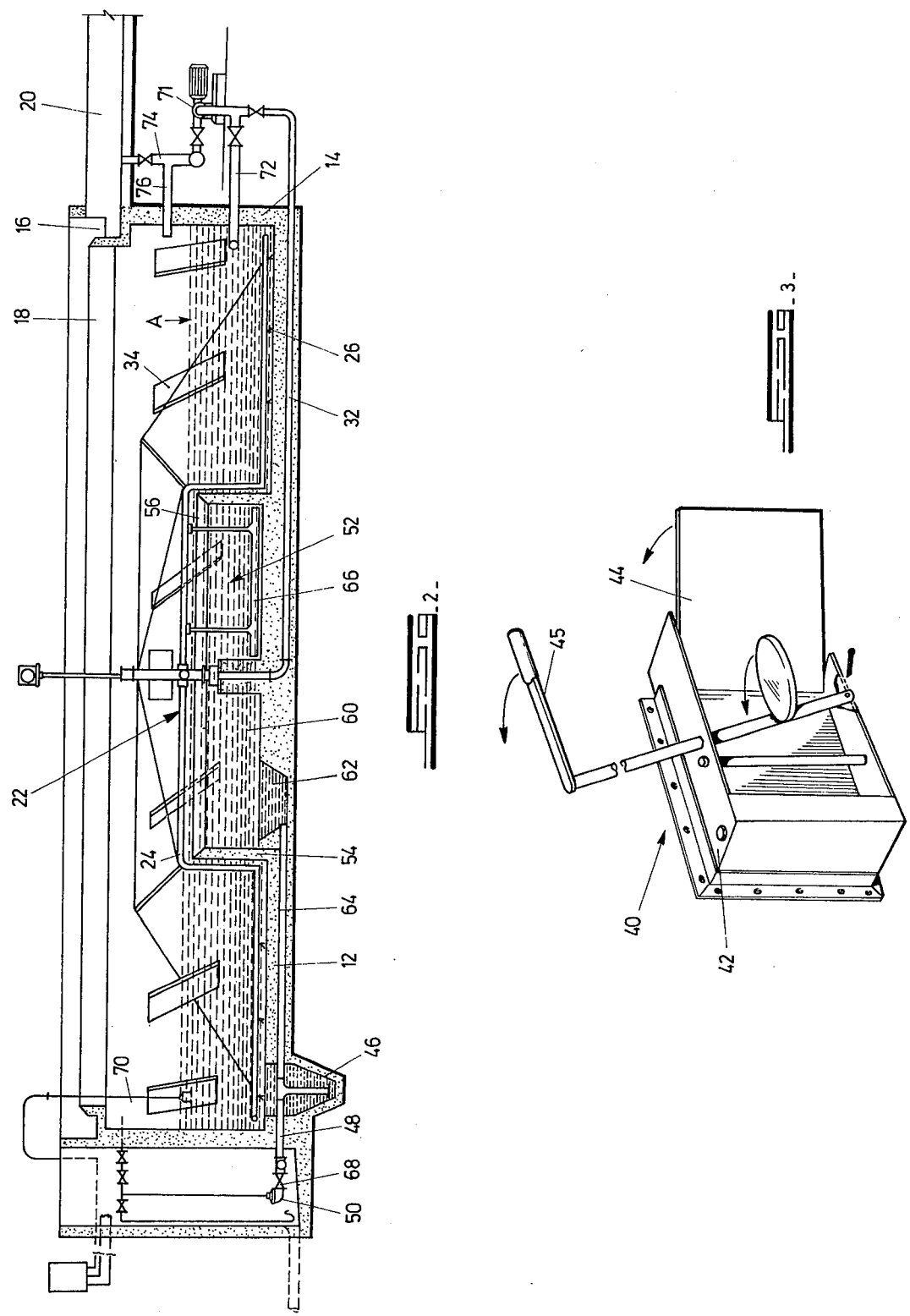

LIQUID CONDITIONING AND SETTLING TANKS

The present invention relates to liquid conditioning and settling tanks employing the sludge blanket principle.

In liquid conditioning and settling tanks liquid to be treated is mixed with floc forming chemicals. The floc particles collect the impurities in the liquid leaving it clear. The production or cultivation of floc particles is termed conditioning. As the floc particles collect the impurities they become heavier and, together with heavy impurities, e.g. grit tend to settle to the base of the tank leaving clarified liquid which is drawn off at the top of the liquid. The floc particles with their collected impurities are termed sludge.

In such tanks employing the sludge blanket principle, a body of sludge particles termed a "sludge blanket" is maintained in suspension in the lower portion of the tank by agitation in that portion. The sludge blanket serves to trap impurities, provides nuclei for the formation of new floc particles and is believed to aid to a certain extent the chemical reaction from which the floc particles result.

The suspension of the sludge particles for an extended period aids collection of impurities and also causes the sludge particles to become larger and heavier and more settleable. However, the agitation of the particles to maintain them in suspension inhibits settling to a certain extent, allowing only the very heavy fractions to settle on the base of the tank.

It is an object of the present invention to provide a tank of the kind described with improved settling.

According to the invention, in a liquid conditioning and settling tank including a generally flat base, a wall surrounding the base, means for feeding liquid to be treated into a lower portion of the tank, velocity reducing take off means for removing from the tank treated liquid at or near the upper surface of the liquid, means for maintaining a sludge blanket in the lower portion of the tank, a sludge outlet in or near the base of the tank and means for inducing sludge particles which have settled on the base to move to the sludge outlet, the improvement is provided of a sludge concentrating receptacle or sump within the lower portion of the tank defining a substantially quiescent zone in the tank, the receptacle having an inlet lip above the base of the tank to receive sludge particles from the surface of the sludge blanket and an outlet for discharging concentrated sludge in the receptacle from the tank.

With the improved tank of the invention the particles at the upper level of the sludge blanket which are too light to settle to the base of the tank can flow over the lip into the sump where the liquid is quiescent and allows the particles to settle more readily.

Further according to the invention, while the sump may be or may include a well which tapers downwardly to a drain, in a preferred form the sump has a flat floor with a well, which is preferably tapered downwardly, and means are provided for urging settled particles toward the well.

According to a feature of the invention, the sludge sump is preferably located in the center of the tank, and extends over a substantial plan area of the tank. An extent of at least 15% is considered optimum. In one form of the invention, the tank is circular in plan and the means for introducing liquid to be treated into the tank preferably includes a tangential inlet directed at or below the horizontal.

In this form of the invention, the liquid introduced through the inlet produces a liquid current, flowing about the circumference of the tank, which impinges on a series of inclined vanes projecting radially inwardly from the wall, the vanes being inclined from their upper to lower edges in the direction of flow of the current and having exposed lower edges beneath which a major part of the liquid current impinging on the vanes is deflected.

In the accompanying drawings which illustrate by way of example a preferred embodiment of the invention, FIG. 1 is a plan view of a tank according to the invention, FIG. 2 is a section taken along line 2—2 in FIG. 1, and FIG. 3 is a detail of the velocity controlled inlet.

The tank illustrated comprises a cylindrical body, e.g. of concrete, having a flat base 12 and a cylindrical wall 14. At the upper end of the tank there is an annular channel 16, the inner wall of which provides a peripheral weir 18 for the tank. The channel 16 leads to a discharge duct 20.

Centrally mounted within the tank is a rotor 22 having a series of arms 24, cranked downwardly as shown in FIG. 2. The arms 24 have on their undersides a series of floor sweeping nozzles 26 which are inclined radially outwards as shown in FIG. 2. At the tip of each arm 24 there is also a drive jet nozzle 30 which projects substantially at right angles from the arm 24 and generally horizontally. The arms 24, which are hollow are fed with liquid through a line 32. The liquid issuing from the nozzles 30 produces jets which serve to rotate the arms 24, while the liquid issuing from the nozzles 26 produces downwardly and radially outwardly directed jets which sweep the base of the tank. The nozzles 26 and 30 and their operation have been more fully described in U.S. Pat. No. 3,113,100. Substantially midway up the wall of the tank there are provided a series of inclined vanes 34, formed by flat metal sheets. The function of the vanes will be described below.

Immediately beneath the vanes 34 is a main inlet 36 for the liquid to be treated. The inlet 36 is comprised of a flash mixing unit 38 of known construction for mixing the liquid with floc forming chemicals, leading through an aperture 39 in the tank wall to a tangential nozzle 40 which is slightly downwardly inclined to the horizontal. The nozzle 40 consists of a housing 42 secured to the tank wall and containing a pivotal flap 44 which defines with the tank wall a variable mouth to control the velocity of liquid issuing from the nozzle. The flap 44 is operated by means of a cam carrying lever 45.

In the base of the tank adjacent its periphery there is provided a sludge outlet 46 in the form of an inverted truncated pyramid leading via a pipe 48 to a vacuum pump 50.

In the center of the tank there is a sludge sump 52 having a cylindrical wall 54 which defines at its upper end a circular lip 56. The sump 58 has a floor 60 in which there is a tapered well 62 which is connected through a pipe 64 to the pipe 48 and hence to the vacuum pump 50.

In operation, liquid to be treated after being mixed in the mixer 38 with floc forming chemicals is forced through the tangential nozzle 40 into the tank, producing a liquid current which flows about the circumference of the tank and strikes the inclined vanes 34.

Liquid is also fed to the arms 24 and out through the floor sweeping nozzles 26 and the drive jet nozzles 30, the latter causing the arms 24 to rotate as already mentioned.

The rotating arms 24, the drive jets, the floor sweeping jets and the circumferential liquid current act in conjunction to provide conditions in the lower zone of the tank which promote the formation of floc particles and which maintain a body of the floc particles in suspension forming a sludge blanket.

As the floc particles in the sludge blanket collect impurities they gain weight and the heavier particles settle to the base of the tank together with any grit or other heavy impurities. The settled particles are swept outwardly by the floor sweeping jets to the circumference where the circumferential liquid current carries them to the sludge outlet 46.

The lighter floc particles, which tend to concentrate at the upper level of the sludge blanket and which are too light to settle under the conditions in the main body of the tank, flow over the lip 56 into the sump 52. Being isolated from the main body of the tank, the liquid in the sump 52 is relatively quiescent and the floc particles are thus enabled to settle to the floor of the sump 52. The settled floc particles are then moved to the well 62 for removal through the pipe 64 by means of floor scrapers 66 depending from the arms 24.

The sludge blanket should ideally be maintained at or slightly above the level of the lip 56. This can be achieved either by manual control of sludge discharge valve 68 or by automatic control of this valve using a sensor 70.

The circumferential liquid current can be accentuated by means of one or more booster jets 72 fed by a pump 71. In the drawing the inlet of the pump 71 is shown connected through valve controlled pipes 74 and 76 to the discharge duct 20 and the upper zone of the tank respectively. However the booster jets may also be connected to the raw liquid supply to be fed therefrom.

The liquid current impinging on the inclined vanes 34 has an important effect on the action of the tank. Due to the inclination of the vanes the major part of the liquid striking the vanes will be deflected downwardly to pass beneath the exposed lower edges of the vanes 34. This downwardly deflected liquid firstly produces high intensity turbulence at the lower edge of the vane which enhances floc formation and secondly serves as a deflector to prevent the tendency of liquid in the lower zone of the tank to rise through the tank to the clarified liquid zone at the top of the tank. The lateral edges of the vanes 34 serve to still any swirl in the tank above the vanes ensuring quiescence in the clarified liquid zone.

While the velocity reducing take off means illustrated is a peripheral weir other forms of take off means can also be used. Thus one may use for instance a multiple weir system comprised of a number of weirs spanning the tank or a perforated pipe system consisting of a series of perforated pipes scanning the tank diametrically.

The upper level of the sludge blanket is indicated at A in FIG. 2, and should ideally be located at the design blanket height of the tank.

I claim:

1. A liquid conditioning and settling tank including a substantially flat base, a wall surrounding the base, means partitioning the lower portion only of the tank into first and second compartments, means for feeding liquid to be treated into the first compartment, velocity reducing take off means for removing treated liquid at or near the upper surface of the liquid, from the upper potion of the tank above the partition means, means for maintaining a sludge blanket in the first compartment, a first sludge outlet in or near the base of the first compartment, means for inducing sludge particles which have settled on the base of the first compartment to move to the first outlet, an overflow sill at an upper end of the partition means over which to transfer sludge particles from the surface of the sludge blanket into the second compartment, the second compartment defining a substantially quiescent zone in the tank, means for concentrating sludge particles in the second compartment and means for discharging concentrated sludge from the second compartment.

2. A tank as claimed in claim 1 in which said partitioning means is constituted by a wall which extends upwardly from the base of the tank.

3. A tank as claimed in claim 1 in which the second compartment is located in the centre of the tank.

4. A tank as claimed in claim 1 in which the second compartment has a substantially flat base, the sludge concentrating means includes a well in the base, the means for discharging concentrated sludge includes a sludge drain in the well, the second compartment further including means for urging sludge particles which have settled on the base to the well.

5. A tank as claimed in claim 4 in which the siid well tapers downwardly to the sludge drain.

6. A tank as claimed in claim 4 comprising an arm, means for rotating the arm, the arm carrying said settled sludge inducing means in the first compartment, and said settled sludge urging means in the second compartment comprising a scraper mechanism driven by said arm.

7. A tank as claimed in claim 1 in which the second compartment is circular in plan.

8. A tank as claimed in claim 1 in which the second compartment extends over a substantial plan area of the tank.

9. A tank as claimed in claim 1 in which said means for introducing liquid to be treated into the tank includes a tangential inlet directed at or below the horizontal, and opening into the first compartment.

10. A tank as claimed in claim 9 comprising a series of vanes projecting inwardly from the wall of the tank and spaced above the base of the tank to permit liquid flow thereunder, the liquid introduced through the tangential inlet flowing circumferentially in said tank below the vanes and impinging on the lower portion of the said vanes, the vanes being inclined to the vertical with their lower edges leading their upper edges in the direction of liquid flow.

11. A tank as claimed in claim 9 comprising means for controlling the velocity of the liquid issuing from the tangential inlet into the tank.

12. A tank as claimed in claim 9 including at least one jet to boost circumferential liquid flow.

13. A tank as claimed in claim 1 in which said means for maintaining the sludge blanket includes a mechanical agitator.

14. A tank as claimed in claim 13 comprising floor sweeping jets for urging the settled sludge particles to move to the first sludge outlet and also aiding in sludge blanket maintenance.

15. A tank as claimed in claim 1 in which said partition means extends from the base of the tank to a height which is between one third and one half the height of the tank.

* * * * *